W. F. WARDEN.
GAGE INSPECTING DEVICE.
APPLICATION FILED OCT. 9, 1911.
1,015,223.
Patented Jan. 16, 1912.
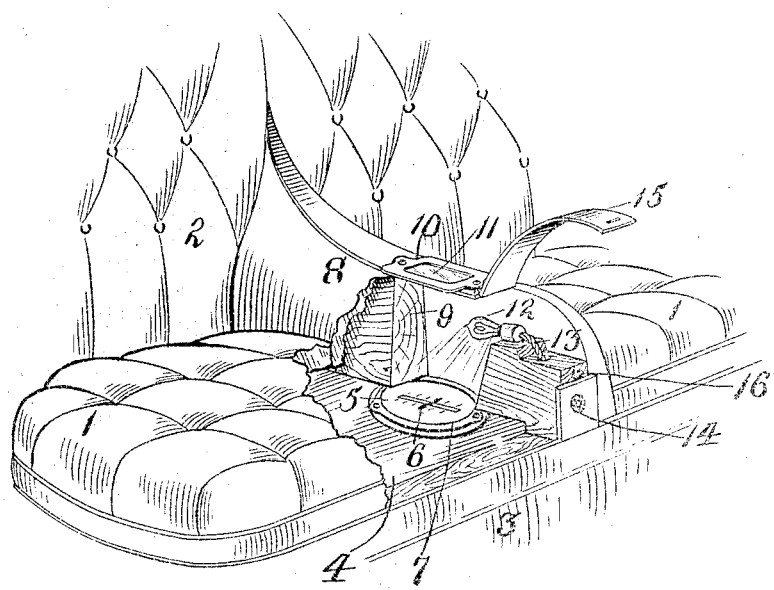
Witnesses:
Austin B Hanscom
A L McClintock
INVENTOR—
William F. Warden,
By C.E. Humphrey
ATTORNEY.

UNITED STATES PATENT OFFICE.

WILLIAM F. WARDEN, OF AKRON, OHIO, ASSIGNOR TO PERRY E. TANNER, OF AKRON, OHIO.

GAGE-INSPECTING DEVICE.

1,015,223.  Specification of Letters Patent.  Patented Jan. 16, 1912.

Application filed October 9, 1911.  Serial No. 653,745.

*To all whom it may concern:*

Be it known that I, WILLIAM F. WARDEN, a citizen of the United States, residing at Akron, in the county of Summit and State of Ohio, have invented new and useful Improvements in Gage-Inspecting Devices, of which the following is a specification.

This invention relates to improvements in self-propelled vehicles employing gasolene as a fuel, and more especially to that type of vehicle in which the supply of gasolene is contained in a tank positioned below one of the seats of the vehicle.

The object of this invention is to provide a well or light-shaft in a convenient portion of the automobile immediately above the indicator, used for showing the amount of gasolene contained in the tank, to make the device convenient of access for ready observation to the user of the vehicle and also to render the placement of the indicating gage employed in a safe position to avoid the liability of danger attendant on the use of a volatile fluid such as gasolene.

With the foregoing and other objects in view, the invention consists in the novel construction, combination and arrangement of parts constituting the invention to be hereinafter specifically described and illustrated in the accompanying drawing which forms a part hereof wherein is shown the preferred embodiment of the invention, but it is to be understood that changes, variations and modifications can be resorted to which come within the scope of the claims hereunto appended.

The drawing presented is a perspective view of so much of a self-propelled vehicle as will clearly show the application of my invention and in operative connection therewith. As now constructed in a large number of instances the gasolene supply tank of an automobile is positioned beneath the front seat of the car which is usually provided with a gage to indicate the amount of gasolene in the tank, the latter being usually positioned upon the frame work of the seat, and is, under normal conditions, covered by the cushions which must be raised for reading the gage to thereby determine the quantity of gasolene in the tank. The raising of the cushions is more or less of a nuisance and at the same time if the reading of the gage is needed in the night-time an auxiliary light of some nature must be employed such as a match or a candle, neither of which may be readily obtainable, so that the duty of ascertaining the condition of the amount of gasolene, provided for a prospective trip, is often neglected with, to say the least, inconvenient results.

It is therefore an especial object of this invention to provide means for ready access to the indicating gage of the gasolene tank, by positioning the indicating gage at a point where ready access can be had to the same and position above the gage a light-shaft or well suitably covered and protected by a transparent medium through which the observer may look in reading the gage without disturbing his cushions or leaving his seat and at the same time, as a necessity for inspecting the condition of the liquid fuel I employ a suitably controlled electric lamp, the light of which is directed onto the face of the gage so as to properly illumine the same when desired, and I also provide a circuit-breaker for closing the circuit temporarily for lighting the lamp during the inspection.

In view of the foregoing the invention is clearly shown in the accompanying drawing wherein the references 1, 1 denote the cushions on the front seat of an automobile, behind which is the ordinary back 2 and below which and supporting the cushions is the frame work 3 of the seat over which extends a top 4. Below the top 4 is a tank of any preferred construction containing a supply of liquid fuel such as gasolene and connected with which is a gage, provided with an indicating face 5 having thereon an indicator 6 for indicating the amount of gasolene in the tank. The indicating finger 6 is usually covered by a sheet of transparent material such as glass suitably held in position by a frame work 7. This indicator is usually positioned immediately below an arm or partition 8 which extends between and divides the front seat of the automobile into compartments. The dividing partition is hollowed out or provided with a light-shaft or well 9 arranged immediately above the upper face of the indicator 6 and the upper wall of the arm or partition 8 is provided with an opening over which is a frame 10 containing a sheet of transparent material 11 suitably arranged on the arm and positioned immediately over the indicator 6.

Positioned within the well or light-shaft and mounted on a suitable support is an electric lamp 12 provided with covered conducting wires 13 running to a source of supply (not shown) and also to a push-button 14 constituting a circuit-breaker. This circuit-breaker is usually positioned on the front wall of the partition and is usually sunk so as not to be ordinarily operated unless desired.

In order to afford ready access to the interior of the well and also for the purposes of cleaning and caring for the internal mechanism contained within the well and above the indicator, I form the front and normally prominent portion of the partition of a single bent member 15 and hinge the same to the stationary portion of the arm or partition to permit the movable portion to be shifted to permit entrance to the well. In order to hold the movable or hinged portion 15 of the arm fixedly in its closed position I provide a temporary locking device 16 secured to the lower front portion of the partition or arm.

It will be noted that if an inspection of the condition of the indicator is desired at any time the operator simply presses the circuit breaker 14 which lights the lamp 12 enabling him to look through the transparent sheet 11 contained in the frame 10 on the arm 8 and condition of the indicator-gage can be readily ascertained at any time irrespective of whether or not the inspection is made in the day or night.

It will, of course, be obvious that instead of providing the well in a central partition of the seat it may be placed in one of the side arms or in any other convenient or appropriate place, so long as it is positioned above the indicator on the top of the gasolene tank.

I claim:—

1. The combination with a self-propelled instrumentality, adapted to carry a tank for a supply of fluid fuel, of an indicator capable of indicating the quantity of fluid fuel in said tank with a suitable portion of said vehicle positioned immediately over said indicator and provided with a well or air-shaft, of a transparent closure member for said air-shaft or well, a controllable lighting instrumentality positioned within said well provided with means for controlling the lighting thereof, a hinge cover for said well adapted to be shifted to permit entrance thereto and means for locking said hinge cover in position.

2. The combination in a self-propelled vehicle adapted to carry a tank for a supply of fluid fuel and having a suitable portion of said vehicle projecting over said tank and provided with a light-shaft or well therein, of an indicator for said tank positioned at the lower end of said well or shaft, a transparent member for said air-shaft, a controllable lighting instrumentality positioned within said well and adapted to illuminate the face of said indicator, means for controlling said light, a hinge cover for the well-containing portion of said vehicle adapted to be shifted to permit entrance to said well and means for locking said hinge cover in position.

3. The combination in a self-propelled vehicle adapted to carry a tank for a supply of fluid fuel and having a suitable portion of said vehicle projecting over said tank and provided with a light-shaft or well therein, of an indicator for said tank positioned at the lower end of said well or shaft, a transparent member for said light-shaft, a controllable lighting instrumentality positioned within said well and adapted to illuminate the face of said indicator, and means for controlling said light.

In testimony whereof I have hereunto set my hand in presence of two subscribing witnesses.

WILLIAM F. WARDEN.

Witnesses:
C. E. HUMPHREY,
A. L. McCLINTOCK.